United States Patent [19]
Bland et al.

[11] Patent Number: 5,505,976
[45] Date of Patent: Apr. 9, 1996

[54] CONTAMINATION-RESISTANT ANIMAL FEEDSTUFFS

[75] Inventors: Bobby J. Bland, Buford; Kurt E. Richardson, Hoschion, both of Ga.; Jose E. Ferrer, Coral Gables, Fla.

[73] Assignee: Anitox Corporation, Buford, Ga.

[21] Appl. No.: 998,600

[22] Filed: Dec. 30, 1992

[51] Int. Cl.$^6$ .................................................... A23K 1/00
[52] U.S. Cl. .......................... 426/532; 426/335; 426/635; 426/807
[58] Field of Search ................... 426/532, 335, 426/331, 807, 623, 630, 635

[56] References Cited

U.S. PATENT DOCUMENTS

| | | | |
|---|---|---|---|
| 2,152,438 | 3/1939 | McHan | 426/807 |
| 3,919,433 | 11/1975 | Senior . | |
| 3,925,560 | 12/1975 | Scott et al. | 426/807 |
| 3,934,041 | 1/1976 | Snyder . | |
| 4,042,718 | 8/1977 | Rawlings et al. . | |
| 4,349,572 | 9/1982 | Larson et al. | 426/807 |
| 4,772,481 | 9/1988 | Rohwer et al. | 426/807 |
| 4,803,085 | 2/1989 | Findley . | |
| 5,021,077 | 6/1991 | Moore . | |

FOREIGN PATENT DOCUMENTS

| | | |
|---|---|---|
| 1061632 | 9/1979 | Canada . |
| 139070 | 12/1979 | Germany . |
| 231282 | 12/1985 | Germany . |
| 276931 | 3/1990 | Germany . |
| 2055059 | 2/1981 | United Kingdom . |
| WO88/10122 | 12/1988 | WIPO . |

OTHER PUBLICATIONS

*Applications and Mode of Action of Formaldehyde Condensate Biocides*, pp. 223–277, HW. Rossmoore and M. Sondossi, Advances in Applied Microbiology, vol. 11 (1988) Academic Press Inc.

Wolford, "Microbiological Screening of Food Preservatives, Cold Sterilants and Specific Antimicrobial Agents as Potential Silage Additives," J. Sci. Agric., 1975, 29, pp. 229–237.

Melhus et al., "The Fungicidal Action of Formaldehyde", Agricultural Experiment Station Iowa State College of Agriculture and Mechanic Arts, Botany and Plant Pathology Section, Research Bulletin, No. 59, Aug. 1920, pp. 355–397.

Index of additives by nutritional and medicinal uses, Feed Additive Copendum, 1990, pp. 341–342.

Nishimuta et al., "Ruminal Bypass of Dietary Soybean Protein Treated with Heat", *Journal of Animal Science*, vol 39, No. 5, 1974, pp. 952–957.

Wills, "Fumigants and sanitation: Update on formaldehyde", *Poultry Digest*, pp. 452 & 454.

van Ekelenburg, "An innovative approach to formaldehyde disinfection", *Misset–Worl Poultry*, vol. 7, No. 7, 1991, pp. 28–29.

Break the Salmonella Chain with Termin–8 Anti–Microbial Preservative, Anitox Corp., Apr. 1992.

Parker, "Reported Swine Salmonellosis May be Tip of Iceberg", Vet. Forum, Circle No. 169 on VF Response Card, Jul. 1992.

ADAS Quarterly Review, vol. 39, pp. 212–225, 1980, C. L. Benham, et al., "Preservation of Moist Hay—A Review".

Journal of the Science of Food and Agriculture, vol. 32, No. 7, pp. 637–646, 1981, A. G. Kaiser, et al., "Fermentation Patterns in Ryegrass, Red Clover and Maize Silages Treated with Formaldehyde Additives at Ensiling".

Journal of Dairy Science, vol. 69, No. 11, pp. 2846–2854, 1986, L. Kung, Jr., et al., "Effect of Adding Formaldehyde, Glutaraldehyde, or Dimethylourea to Alfalfa Before Ensiling".

*Primary Examiner*—Michael W. Ball
*Assistant Examiner*—Daniel J. Stemmer
*Attorney, Agent, or Firm*—Oblon, Spivak, McClelland, Maier & Neustadt

[57] ABSTRACT

A formaldehyde-treated animal feedstuff which is resistant to contamination by pathogenic bacteria is obtained by spraying an aqueous solution containing 10–50 wt. % formaldehyde on an animal feed, to obtain 200–1000 g/ton of a hydrolyzable formaldehyde adduct with a coefficient of variation 7% or less. Methods of reducing disease in animals, reducing doses of antimicrobial drugs in animal feed, and reducing drug residues in meat products are disclosed.

17 Claims, 4 Drawing Sheets

CONTAMINATION-RESISTANT ANIMAL FEEDSTUFFS

BACKGROUND OF THE INVENTION

1. Field of the Invention

This disclosure pertains to a process of treating animal feed with aqueous formaldehyde which renders the feed highly resistant to recontamination by pathogenic bacteria such as Salmonella, Streptococcus, Staphylococcus, E. coli, Clostridia and Bacillus.

2. Discussion of the Background

In the early 1960's people in the field of animal husbandry were shocked to learn that toxins produced by molds growing in feedstuff had killed thousands of turkeys. This phenomenon led to twenty-five years of intensive study in private laboratories and universities on molds and the toxins they produce. By the 1980's it was generally recognized that molds in animal feedstuffs are an economic hazard as well as a health hazard to man and animal. Mold inhibitors, usually containing propionic acid, were added to animal feedstuffs to control mold growth. In 1977 few animal feed producers were using mold inhibitors in their feeds. Today most feed producers use mold inhibitors.

Given the intense study and publicity surrounding molds it is surprising, in retrospect, that no one seemed to be concerned about another member of the microbiological kingdom, bacteria. However, in the early 1980's a group of bacteria known as Salmonella was brought forcefully to the public's attention because several people, in isolated cases, died from Salmonella poisoning, i.e., by ingesting large amounts of Salmonella bacteria. Health authorities traced the causes of these Salmonella infections back to their sources and often implicated meat and eggs. Outbreaks of Salmonella poisoning recurred over the years and became a serious concern to people in many countries, especially in England and the United States. The Food and Drug Administration in the U.S.A. came under pressure from Congress to find a solution to Salmonella poisoning. The British government also pressed local authorities to solve the problem. As a result, slaughter houses were cleaned up, some were closed and thousands of hens were condemned because they were in flocks where Salmonella was found. Producers spent large amounts of money to ensure Salmonella-free produce. But instead of improving the situation, contamination by Salmonella increased. The health authorities of England publicly admitted that all their efforts had not even diminished the problem.

In 1982 scientists at Anitox Corporation began laboratory studies on Salmonella and found that the original source of contamination is usually the feedstuffs the animals eat. It was shown that very light contamination of Salmonella in feedstuffs is all that is needed to contaminate the animal. Once the animal (the use of the word animal includes all forms of livestock such as cattle, poultry, swine, fish, etc.) eats the contaminated feedstuff the bacteria multiply rapidly in the moist warm environment of the gut and feces. In fact under these ideal conditions one Salmonella bacterium can multiply to 1,000,000 bacteria in 30 hours. This increase, literally an explosion of growth, contaminates the intestinal tract, the feces, the litter, the hair, the feathers and the surrounding environment. When these animals are processed the contamination increases and so all efforts to control Salmonella by sterilizing the production facility become inadequate. Even though federally-licensed vaccines against Salmonella are available for swine, laying hens and breeders, they have had limited success controlling the problem. For instance, the chicken vaccine cannot be used in broilers or meat-type chickens due to accumulation of vaccine residues in the meat. Today it is estimated that 30% of uncooked chicken on the supermarket shelf is contaminated with Salmonella.

It would seem that it should be easy to dip a carcass in a bacteriocidal solution and kill all the Salmonella, but this is not the case because recontamination occurs quickly. Furthermore, radiation treatment, which has recently been approved by the Food & Drug Administration, will kill all bacteria on animal carcasses. But again, this technique has not solved the problem because recontamination of the carcass usually occurs prior to its consumption by the consumer.

It is now generally recognized that limiting the introduction of Salmonella through the feed is the most effective long range plan for improving the situation and many compounds with known bacteriocidal properties, such as lactic acid, propionic acid, formic acid, butyric acid, sorbic acid, benzoic acid and combinations of these have been tested. While many of these agents kill bacteria in solution, they do not kill all the bacteria in animal feedstuffs. Woolford, M. K., "Microbiological Screening of Food Preservatives, Cold Sterilants and Specific Antimicrobial Agents as Potential Silage Additives", J. Sci. Ed. Agric. 1975, 26, 229–237. To be effective against Salmonella, a bacteriocidal treatment must kill essentially all of the bacteria. Methods that kill 95% or even 99% are largely ineffective because the residual bacteria can multiply rapidly and recontaminate the feedstuff, and eventually the entire processing facility.

It is generally known that formaldehyde kills Salmonella when applied to feedstuff in large quantities. Mixtures of aliphatic acids, formaldehyde, methanol and terpenes are very effective when applied to feed by conventional spraying equipment. However, such treatments fail to eliminate the Salmonella effectively when too little formaldehyde is used or when the solution is not sprayed uniformly onto the feedstuff, thereby allowing some small number of bacteria to survive and multiply.

We have developed an improved process for applying formaldehyde to feed in significantly lower doses yet still kill essentially all the Salmonella, and in addition, the process kills virtually all other pathogenic bacteria in animal feedstuffs. The process involves applying aqueous formaldehyde onto the feed in a mist or atomized spray while mixing the feed components in a manner that ensures uniform production of a chemical adduct between formaldehyde and the feed. We have found that formaldehyde-treated feedstuffs of the present invention resist recontamination long after the formaldehyde itself has dissipated, up to 60 days or more! This bacterial resistance is correlated with the quantity and uniformity of distribution of a hydrolyzable formaldehyde adduct which can be readily recovered from the feed and measured. The more evenly distributed this adduct is, the more resistant to recontamination the feed is. Bacterial resistance is important because conventional feedstuffs are usually contaminated during transport and storage under the usual inadequate sanitary conditions. Feed generally becomes recontaminated during transport by passing through contaminated feed-handling equipment, such as augers, elevators, drag lines, bagging equipment and trucks. In storage, feed can become recontaminated by storage bins or by contact with dust, insects, rodents, birds and other animals. The quantity of bacteria capable of contaminating the feed may vary from less than 1 colony per gram, up to numerous colonies per gram of feed. It is very difficult to keep the animals healthy when they are eating contaminated feed. The present invention will change the way animals are fed, improve the health of animals, have a favorable economic impact on the animal producers and provide a cleaner, healthier meat for the consumer.

Animal feedstuffs are universally contaminated with many different pathogenic bacteria—a fact not heretofore commonly known by producers of meat, eggs and milk. We have analyzed feeds from North America, Europe, Asia and South America and found them to contain pathogenic bacteria, most commonly Streptococcus, Staphylococcus, Salmonella and E. coli. This fact seems to explain why producers find it necessary to include maintenance doses of antibiotics and other drugs in animal feeds to control Streptococcus and Staphylococcus infections in the animals and to increase yields of meat. However, the use of drugs in meat production is becoming controversial and highly objectionable to consumers. Therefore, a method of reducing disease, increasing feed conversion and yield of meat without administering antimicrobial drugs to the animal is needed. We have found that when animals are raised on formaldehyde-treated feed they thrive without maintenance doses of several antimicrobial drugs, and since they are healthier, they have little need for chemotherapeutics of any kind. In contrast, conventional feeds which have been treated with steam and pelletized do not resist recontamination. Therefore, steam treated pelletized feeds are a major cause of Streptococcus and Staphylococcus infections in livestock. Maintenance doses of several antimicrobials—both antibiotics and mycotic agents, are generally required in conventional pelletized feed to keep the animals healthy. We have discovered that formaldehyde treatment not only kills all types of pathogenic bacteria, but that the resulting feed has an unexpected property. It reduces or eliminates the need to routinely administer many drugs, particularly antibiotics, to livestock through feed. Producers have traditionally used maintenance doses of certain drugs, such as mycostatin, chlortetracycline, furazolidone, bacitracin and dimetridazole, to provide a growth advantage, in terms of feed conversion. A complete list of feed additives allowed by the FDA, grouped by their nutritional and medicinal use by species, is found in the Feed Additive Compendium, Miller Publishing Co., Minneapolis, Minn. However, by feeding the animals a diet consisting essentially of formaldehyde-treated feedstuffs, it is now possible to completely eliminate some drugs and reduce the dosage of others without suffering a loss in feed conversion. In most cases feed conversion can be increased by a combination of formaldehyde-treated feed and continued use of one antimicrobial, such as chlortetracycline, without others.

In Europe and the United States there is growing concern over the use of antibiotic and mycotic agents in animal production for two reasons. The first concern is that most of these medicines contaminate the tissues of the animals and are consumed by humans when they eat the meat; a second concern is that pathogenic bacteria growing in animals soon develop resistance to the types of antibiotics that were used in the feed, which means that when these bacteria infect humans through contaminated meat, antibiotics which are normally effective in humans frequently fail to kill the resistant bacteria. Some antibiotics have already been banned for use in animal feed in certain places to prevent the inevitable emergence of antibiotic-resistant strains of Streptococcus, Staphylococcus, Salmonella and E. coli. It is anticipated that within a few years most antibiotics currently in use will be banned. One embodiment of the present invention eliminates the growth advantage, in terms of feed conversion, provided by maintenance doses of many drugs commonly used in animal husbandry and will be welcomed by the meat producer and public alike because the method leaves no residue in tissue, eggs or milk.

Both liquid solutions and gaseous formaldehyde are known to kill bacteria, Melhus, E.I. et al, "The Fungicidal Action of Formaldehyde", (Research Bulletin, No 59, August 1920, Agricultural Experimental Station, Iowa State College of Agriculture and Mechanic Arts, Ames, Iowa). It is used as a fumigant (H. P. van Ekelenburg, Misset-World Poultry, Vol. 7, 28, 1991 and F. K. Wills, Poultry Digest, 452, September 1992). An aqueous solution of formaldehyde, formic acid, methanol and sugar, preferably molasses, has been used for preserving ruminant feed, as described in U.S. Pat. No. 4,772,481. However, the viscosity of the solution is high, due to the presence of 23% to 74% by weight sugar solids. Solutions having high viscosity are not generally useful in the present method of producing formaldehyde-treated feedstuffs because it is critically important to form a mist of the solution, which is only practical if the solution has relatively low viscosity. The use of aqueous formaldehyde to destroy pathogenic bacteria in livestock waste is disclosed in U.S. Pat. No. 4,349,572 and 3,919,433. The treated excreta is useful as a feed supplement, however, the resulting feed is not highly resistant to recontamination.

We have observed that formaldehyde reacts reversibly with feedstuffs to produce a hydrolyzable adduct, and that formaldehyde-treated feed will resist bacterial growth long after the formaldehyde has been removed. One aspect of this invention is a method of applying aqueous formaldehyde to feed which maximizes bacterial resistance while greatly minimizing the effective amount of formaldehyde. When sprayed in a fine mist on animal feedstuffs, aqueous formaldehyde produces a uniformly distributed adduct that can be recovered by acid hydrolysis.

If the feed is kept relatively dry it will resist contamination under aerobic conditions for 30–45 days and in some cases 60 days or more, depending on the quantity and uniformity of distribution of formaldehyde adduct. These parameters can be measured by hydrolyzing the adduct under acidic conditions and recovering formaldehyde. The feeds of the present invention are novel and have the unexpected property of being more resistant to contamination by pathogenic bacteria than previously available feeds, even those treated with much more aqueous formaldehyde, i.e., where the solution is applied by conventional spraying equipment. The present invention can be used to produce a healthier animal and a more wholesome meat for the consumer at reduced cost.

SUMMARY OF THE INVENTION

One object of this invention is to provide a method of making animal feedstuff that is substantially resistant to contamination by pathogenic bacteria encountered during transport and storage under aerobic conditions. The process can be applied to individual major ingredients of feed, defined as any component amounting to at least 1% of the total, or it can be applied directly to a complete feed. Examples of suitable major feed ingredients include feather meal, proteins of animal origin, animal by-product meals, fish meals, poultry meals, cereal grains and vegetable protein meals. The resulting feed is dry in nature having 1–20% moisture content, in the form of whole grains, coarse ground materials or fine ground materials containing 100–1000 grams of formaldehyde adduct per ton, distributed uniformly with a coefficient of variation 7% or less, preferably 5.5% or less more preferably 3.5% or less. The feed or major ingredient is essentially free of formaldehyde vapor. The finished product is a poultry feed, including poultry starter feed, poultry grower feed, poultry finisher feed and poultry layer feed. In addition, the present invention provides similar grades of swine feed, beef cattle feed, dairy cattle feed, horse feed, aquaculture feed and pet feed.

Another object of this invention is to provide a formaldehyde-treated animal feed which is resistant to contamination by pathogenic bacteria obtained by a process comprising: spraying an aqueous solution containing 10–50 wt. % formaldehyde on a complete animal feed or major ingredient thereof in an amount of 0.2–4.0 pounds dry weight of formaldehyde per ton of said complete animal feed or said major ingredient while mixing or ingredient, and recovering an animal feed comprising 100–1000 grams of hydrolyzable formaldehyde adduct per ton of feed distributed a coefficient of variation 7% or less and 1–20% moisture Another object is a method of reducing or eliminating the need for antimicrobial drugs in the diet of livestock by eliminating the growth advantage gained in commercial meat production facilities through the use of such drugs in livestock feed. The method reduces the drug-related cost of meat production and reduces drug residues in meat.

Another object is to provide an improved method for preparing formaldehyde-treated feed using relatively small quantities of formaldehyde solution which method comprises spraying an aqueous solution containing 10–50 wt. % formaldehyde on a complete animal feed or major ingredient thereof using a spray nozzle which provides a mist or atomized spray and recovering an animal feed comprising 100–1000 grams of a hydrolyzable formaldehyde adduct per ton of feed distributed with a coefficient of variation of 7% or less.

Another object is to provide a method of raising livestock while reducing or eliminating one or more antimicrobial drugs in the diet of meat, poultry or fish-producing livestock which comprises feeding livestock a diet consisting essentially of formaldehyde-treated feedstuff which is substantially free of pathogenic bacteria and resistant to contamination by pathogenic bacteria.

The present invention provides a method of raising livestock comprising: feeding livestock a diet consisting essentially of formaldehyde-treated feedstuff which is substantially free of pathogenic bacteria and is resistant to contamination by pathogenic bacteria obtained by a process comprising spraying droplets of an aqueous solution containing 10–50 wt. % formaldehyde on a complete feed or a major feed ingredient thereof in an amount of 0.2–4.0 pounds dry weight of formaldehyde per ton of said complete animal feed or said major ingredient while mixing said complete feed or ingredient; and recovering an animal feedstuff containing 100–1000 grams of hydrolyzable formaldehyde adduct per ton of feed distributed with a coefficient of variation of 7% or less and 1–20% water. The method is particularly valuable where livestock live in large groups, such as facilities for meat, poultry or fish production containing more than 2,000 chickens, 100 pigs or 2,000 fish, respectively.

The invention also provides a method of reducing disease in livestock which comprises feeding livestock a diet consisting essentially of formaldehyde-treated feedstuffs which are substantially free of pathogenic bacteria and resistant to challenge by 1000 colonies/gram of feedstuff by Salmonella or *E. coli* after 45 days under aerobic conditions. The method is particularly effective where the livestock live at a facility containing more than 2,000 chickens, 100 pigs or 2,000 fish.

DETAILED DESCRIPTION OF THE PREFERRED EMBODIMENTS

Formaldehyde in liquid solution has been used to kill Salmonella in animal feeds before, however, the goal was merely to provide an immediate killing effect. Therefore 37% formaldehyde solutions and product mixtures containing formaldehyde were used by simply mixing the solution thoroughly with feed in sufficient quantity to kill all the Salmonella. Aqueous formaldehyde was applied to feed using the same spray equipment ordinarily used to apply mold inhibitors. This equipment is designed to produce a coarse spray, i.e., droplet sizes in the range 260–400 microns, to decrease energy requirements and increase the rate of spraying in terms of gallons per hour. The need to distribute formaldehyde evenly throughout the feed was understood because it was known that more than 99% of the Salmonella must be killed to prevent it from quickly recontaminating the feed. Coarse spraying with large amounts of formaldehyde is adequate for that purpose. Therefore, it was surprising to discover that when aqueous formaldehyde was sprayed onto feed in a mist using an atomizing sprayer the resulting feedstuff was substantially more resistant to contamination by pathogenic bacteria than feed treated with the same quantity of formaldehyde using conventional spray nozzles. In each case, all of the contaminating bacteria were killed immediately but the fine spray method produced a strong residual killing effect. In addition we observed that much less formaldehyde was necessary to obtain equivalent resistance levels, in terms of the time a sample could remain under aerobic conditions yet resist a challenge with *E. Coli* or Salmonella. When formaldehyde is applied with an atomizing spray nozzle the resistance to contamination is greater—so much greater that the amount of formaldehyde used can be significantly reduced. Therefore the feed is less costly to produce yet it resists recontamination for longer periods of time, which enables the producer to store feed longer and still enjoy the benefits of a pathogen-free feed.

It is possible to characterize a difference in physical properties between the present feed and feeds treated with the same amount of formaldehyde using conventional spray nozzles. The quantity of formaldehyde adduct can be estimated by recovering formaldehyde from the product in an acidic hydrolysis reaction. The quantity of formaldehyde adduct reported herein is not necessarily the actual weight of the adduct, but rather, it is the weight of formaldehyde recovered from the feed. A uniform distribution of the recoverable adduct, in terms of the coefficient of variation (CV), is closely related to the feed's contamination resistance. The adduct's distribution is related to the size of spray droplets, the thoroughness and speed of mixing the feedstuff, the rate at which solution is applied and the residence time of feed in the mixer. A compromise must be reached with regard to some conflicting variables. For instance, it is desirable to move feed through the mixer as quickly as possible for economic reasons, but too short a residence time results in inadequate mixing even if the flow rate of formaldehyde solution is increased. The residence time in a 2 ton horizontal mixer is typically 3–5 minutes. The formaldehyde solution should be delivered at a rate of 20–40 gal/hr. The size of spray particles is preferably small, 20–80 microns. However this range limits flow rate and may require several nozzles. Larger spray sizes, up to about 250 microns, can also be effective if other variables are adjusted to compensate, such as increased mixing rate or residence time, increased amounts of formaldehyde solution, or decreased resistance to contamination by the finished feed. Typically the best compromise will be in the 10–200 micron range. Suitable application rates for 1 kg of solution per ton of feed span the range of 15–90 seconds, preferably 45–60 sec.

The coefficient of variation should be 7% or less to achieve significant resistance to pathogenic bacteria. In general term "resistant to contamination by pathogenic bacteria" means that a challenge with 1000 colonies per gram of feed results in death of substantially all the bacteria within 24 to 72 hours. In particular, the term "resistance to contamination by Salmonella or *E. coli* " means that a challenge with 1000 colonies of Salmonella or *E. coli* per gram of feed results in 1 colony or less per 25 grams of feed after 24 hours incubation at 25° C. A CV value of 5% or less allows reduced quantities of formaldehyde to be maximally effective. Uniform distribution results in much less emission of formaldehyde vapor from the freshly treated feed which appears to increase the yield of adduct. Bacterial resistance is thus a function of the coefficient of variation. At 7% CV the product will have relatively low resistance, which also varies with the quantity of formaldehyde applied. At 4 lbs. dry wt. of formaldehyde per ton of finished feed a 7% CV results in about 30 days resistance as measured by a challenge with *E. coli* (1000 colonies/gram of feed). Conversely, at 2.0% CV and only 2 lbs. dry wt. of formaldehyde/ton a finished feed will resist contamination by *E. Coli* (1000 colonies/gram of feed) for about 60 days. Sampling procedures for obtaining representative samples of feed are described in Example 16, so that the coefficient of variation can be readily determined.

The increased bacterial resistance of feedstuffs according to the invention can be seen in the following experiment. A sterilized poultry starter mash (500 grams/treatment quantity level) was treated with 37 wt. % formaldehyde solution in quantities of 0.66, 1.33 and 2.00 pounds dry weight of formaldehyde per ton. One set of samples was treated with a coarse spray (270 microns) at 1.8 gal/hr and another was treated with fine mist (43 microns) at 25.5 gal/hr. Each sample of 500 grams was challenged with 20 ml of a liquid inoculum of *Escherichia coli* ($10^6$ colonies/ml) one week after treatment. The feed treated with a coarse spray quickly became contaminated with *E. coli* whereas all quantity levels of the feed treated with a fine mist were free of detectable levels of *E. coli* within 48 hours of the inoculation and for another 60 days, after which the test was discontinued. An experiment using 20 ml of inoculum containing Salmonella ($10^3$ colonies/ml) for recontamination gave similar results.

Most types of bacteria can be recovered from feed for assay purposes by placing a representative sample in an isotonic solution, such as buffered phosphate or saline, and plating this solution on a selective microbiological media. The inoculated media is incubated to visualize the bacteria. Some bacteria, such as Salmonella, may require selective pre-enrichment and/or enrichment steps to recover low levels of bacteria and damaged or stressed cells prior to selective media plating.

Suitable major ingredients of animal feed include cereal grains such as corn, grain sorghum, wheat, barley, oats, vegetable protein meals and animal by-product meals. Complete animal feed products can also be treated with a mist of aqueous formaldehyde to produce an animal feed of the present invention. A typical complete feed would be a mash or pelletized feed containing corn, soybean meal, minerals, vitamins and other micro-ingredients having a total of 7–22% protein, 3–6% fat, 2–5% fiber and an energy value of 1300–3500 kcal/gram.

Many different animal feedstuffs can be prepared according to the invention. They are scientifically formulated for the species and age of animal being fed. For example, a laying hen diet would have more calcium in it than would a broiler finisher diet. The formulations thus vary in content. Production of the feed is usually done in a mixer where all ingredients are added by weight then mixed. This invention can be used to make a turkey grower feed, a chick starter feed, a sow feed, a dairy cow feed, a feed for fish, shrimps, eels, etc. The formaldehyde solution should preferably be applied to complete feeds for maximum resistance.

The quantity of formaldehyde is in the range 0.20–4.0 pounds dry wt. of formaldehyde per ton of feed, preferably 0.66–1.32 pounds. A feed major ingredient contains from 100 to 1000 grams of adduct per ton. A complete feed product contains about 100–660 grams of adduct per ton. Formaldehyde is readily available in 37 wt. % aqueous solution. One gram of this solution contains 370 mg or 12.3 mmol of formaldehyde.

The preferred mist or atomized spray of this invention consists of droplets in the size range 10–250 microns, preferably 20–200 microns and most effectively at 40–80 microns. Spray nozzles capable of delivering these droplet sizes are commercially available. The preferred nozzles are those in which the liquid is supplied to the nozzle under pressure and compressed air is mixed with the liquid to produce a completely atomized spray. The droplet size is a function of air pressure and liquid pressure, so that a single nozzle can provide different sprays if desired. Particle droplet size can be reduced by increasing the air pressure to liquid pressure ratio. Droplet sizes at the different ratios can be determined by laser optics techniques using e.g., model OAP-2D-GA2 manufactured by Particle Measuring Systems, Boulder, Colo.

A sufficient number of nozzles should be used to cover the surface of the feed in the mixing vessel. Para-formaldehyde is an insoluble condensation product of formaldehyde that should be removed prior to application of the solution to avoid clogging the spray apparatus. The solution preferably contains a $C_1$–$C_8$-alcohol such as methanol, ethanol, propanol, butanol, pentanol, hexanol, heptanol, octanol or phenol in the range 5–15 wt. % to stabilize the formaldehyde.

The aqueous formaldehyde solution can contain additional ingredients conventionally used to preserve animal feed such as 5–15 wt. % $C_1$–$C_8$-carboxylic acids or salts thereof including formic acid, acetic acid, propionic acid, butanoic acid, benzoic acid, sorbic acid and lactic acid. Suitable salts include alkali, alkaline earth, calcium, sodium and ammonium. The solution may also contain natural terpenes in a concentration of 0.5 to 2.0 wt. %. Terpene addition may also require 0.5 to 2.0 wt. % of a surfactant to solubilize the terpene. Terpenes are thought to help the formaldehyde penetrate the bacterial cell wall during the initial sterilization process.

Feedstuffs referred to in this invention preferably have a moisture content from 5 to 20%. Higher water content provides an ideal environment for subsequent bacterial growth making it difficult to prevent recontamination of the feed. The water content is usually between 6–14 wt. % most preferably below 12%. The moisture level of feed can be determined by measuring the moisture weight loss that occurs during heating of feed at 110° C. for 16 hours.

Spray application of the formaldehyde solution to the feedstuff is done at ambient temperature, which can range widely from winter to summer, but normally is in the range of −5° C. to 40° C. Subjecting the treated feed to increased temperature in the pelletizing process is acceptable and does not destroy the effectiveness of the treatment.

The resistance to contamination of formaldehyde-treated feedstuffs unexpectedly enables the production of livestock on an industrial scale with reduced need for maintenance doses of antibiotics. In most modern animal production facilities, a veterinarian diagnoses the presence of bacterial diseases based on symptoms such as decreased growth rate, poor feed conversion efficiency, diarrhea, mortality and other productivity problems. We have found that a diet consisting essentially of formaldehyde-treated feed greatly reduces the incidence of Streptococcus, Staphylococcus, Salmonella and E. coli infections in the animals, to the point where the levels of antimicrobial drugs can be greatly reduced or entirely eliminated from the bulk feed without a loss in feed efficiency, i.e., only isolated infections occur and these problems can be treated individually.

Raising chickens on a commercial scale with less of a given antimicrobial drug in the feed according to the invention is simply a matter of providing a diet consisting essentially of formaldehyde-treated feedstuffs with only that quantity of drug required to maintain the feed conversion observed when a similar feedstuff containing additional drug but without formaldehyde is used in a control experiment. In some cases an antimicrobial drug can be completely eliminated. Over time, as production facilities become cleaner as a result of this method it may be possible to completely eliminate the use of all antibiotics in the feed. In the following example, we show that the number of different drugs used can be cut, thereby reducing antimicrobial drug residues in the meat produced in accordance with the invention. It is best to start the chickens from day old on formaldehyde-treated feeds rather than starting in the middle of the feeding cycle. The former procedure greatly reduces the likelihood of colonization in the chickens' intestines by pathogenic bacteria. A typical complete feed for broiler chickens is shown in Example 3. This formula is fed to the chickens free choice in large houses containing up to 10,000 chickens. The health of the chickens is monitored by a veterinarian who prescribes treatments when diseases occur. The birds eat about two pounds of feed for each pound of live weight gain. When the feed is treated with formaldehyde the normal procedures are not changed, but the birds are healthier, require fewer drugs on an individual basis, and grow more efficiently. They display substantially the same feed conversion in high density conditions with or without antimicrobials such as mycostatin or dimetridazole in the feed.

Other antimicrobials which can be eliminated in whole or in part by the present method are chlortetracycline, oxytetracycline, bacitracin, penicillin, laselocid, melengestrol, monensin, neomycin, apramycin, bambermycins, virginiamycin, lincomycin, furazolidone, nitromide, nitrofurazone, sulfanitran, sulfadimethoxine, roxarsone, tylosin, arsanilic acid, carbodox, dichlorovos, novobicin, orthomethoprim, and timulin. Additional antimicrobial drugs presently allowed as feed additives by the FDA which can be eliminated in whole or in part are listed in the Feed Additive Compendium. The growth advantage gained by using these drugs can be equaled without the drugs, when using formaldehyde-treated feed, so they can be eliminated from the diet, or reduced to the dosage where no further growth advantage is obtained by using additional drug. In order to decide if a drug can be eliminated or the dose reduced, a comparison of feed conversion should be made between animals fed steam pelletized feed containing a given drug or drugs and the same feed mixture treated with formaldehyde before steam pelletizing but without a given drug or with a reduced dosage(s). If the feed conversion is found to be essentially the same using both feeds, then the growth advantage has been eliminated, and consequently, the need for that drug or dosage level has been eliminated. Differences in feed conversions of 0.02 pounds of feed consumed per pound of body weight gain are considered normal in commercial production facilities and within experimental variation.

The following examples are for the purpose of illustration only and are not intended to limit the invention.

EXAMPLE 1

Production of fish meal in a continuous flow system: The raw whole fish are passed into a cooker and subsequently through a series of presses. This removes most of the oil and the solid residue left is the fish meal. As the fish meal passes along a 16 inch screw conveyor at the rate of 5 tons per hour, formaldehyde solution is sprayed in a mist onto the fish meal. The composition of the solution is 33% formaldehyde, 10% methanol, 9% propionic acid, 0.5% terpene, 0.5% surfactant and 47% water. A filter is placed prior to the pump to take out any paraformaldehyde in the solution which would clog the nozzles. The liquid is supplied to stainless steel nozzles under pressure. The liquid and compressed air are mixed externally to produce a completely atomized spray through the nozzle. The spray nozzles are mounted in the top cover of the screw conveyor. There are two nozzles mounted 3 feet apart which deliver droplets in the range 30–50 microns. The fish meal is treated with 8 pounds of formaldehyde solution per ton. The pump is set to deliver 40 pounds of formaldehyde solution per hour (8 lbs/ton ·5 tons/hr =40 lbs/hr). After spraying, the fish meal is conveyed into storage hoppers to await shipment. The fish meal is relatively dry (8% moisture), finely ground and resistant to recontamination for 60 days under aerobic conditions. The coefficient of distribution (CV) is 5.5% and 600 g/ton of adduct was recovered according to the method of Example 14. After 30 days in aerobic conditions a 500 g sample was challenged with 20 ml (100 colonies/ml) of Salmonella. No Salmonella was detectable in the sample three days after challenge.

EXAMPLE 2

A train carload containing 100 tons of wheat is unloaded into storage. As the wheat drops out of the bottom of the car into a pit it is picked up by conveyors to move it to a bucket elevator. The conveyor leading to the bucket elevator is a 16 inch screw conveyor. Four air atomizing nozzles with a capacity of 5 gallons per hour and a droplet size of 40–80 microns are mounted in the top cover of the screw conveyor at 3 foot intervals. The composition of the solution is 33% formaldehyde, 10% methanol, 9% propionic acid, 0.5% terpene, 0.5% surfactant and 47% water. The wheat is treated with three pounds of formaldehyde solution per ton while moving through the conveyor at a rate of 50 tons per hour. Therefore the application rate of formaldehyde solution is 3 lbs/ton ×50 tons/hr.=150 lbs/hr. After treatment the wheat moves into the bucket elevator which carries it up and drops it into the storage bin. The wheat is whole kernel wheat. After 30 days a 500 gram sample was challenged with 20 ml of Salmonella (100 colonies/ml). The sample had no detectable Salmonella two days after challenge. The coefficient of variation was 5.5% and 350 g/ton of adduct was recovered according to Example 14.

EXAMPLE 3

A three ton batch of broiler grower pellets as a complete feed is made as follows. The batch is made in a feed mill using a three ton horizontal computer controlled mixer. The mixer design is such that the outside hull of the mixer is stationary and the mixing is done by rotating paddles inside the mixer. The ingredients for the batch are individually weighed into the weigh hopper which is directly above the mixer. The batch ingredients weighed into the weigh hopper are shown in Table 1:

TABLE 1

| BROILER GROWER DIET | |
|---|---|
| Ingredient | Pounds |
| CORN | 2232 |
| MILO | 1560 |
| SOYBEAN MEAL | 1470 |
| FEATHER MEAL | 120 |
| POULTRY MEAL | 150 |
| FAT | 291 |
| VITAMINS | 6 |
| CHOLINE CHLORIDE-70 | 3 |
| TRACE MINERALS | 6 |
| COPPER SULFATE | 3 |
| DEFLUORINATED PHOSPHATE | 84 |
| LIMESTONE | 31.8 |
| SALT | 13.2 |
| LYSINE | 3 |
| DL-METHIONINE | 12 |
| COCCIDIOSTAT | 6 |
| ANTIBIOTIC | 3 |

Once the ingredients are weighed and the mixer is clear of the previous batch, the contents of the weigh hopper are dropped directly into the mixer. This transfer takes only a few seconds. The paddles begin to turn, mixing the ingredients. The mixer hull is equipped with three air atomized nozzles giving droplet sizes in the range of 40 to microns. A formaldehyde solution containing 33% formaldehyde, 10% methanol, 9% propionic acid, 0.5% terpene, 0.5% surfactant and 47% water is sprayed while mixing the ingredients over a period of 40 seconds. The feed is mixed for an additional 4 minutes. After mixing, the feed is dropped from the mixer into a holding tank below, again in a few seconds. The feed is then moved by a screw conveyor to an overhead bin. From this surge bin it is transferred by gravity to a steam conditioning chamber to add moisture to the feed. From there the feed goes to a pelletizer which compresses the mash feed into small firm pellets under pressure and 175° F. temperature. After the pelletizer the feed passes through a cooler to lower the temperature of the pellets to near ambient temperature and then on to storage for shipment. A 1000 g sample was challenged with 20 ml of Salmonella (1000 colonies/ml) 28 days after treatment with formaldehyde. Two days later the sample had no detectable Salmonella. The coefficient of variation of the adduct was 2.0% and 390 g/ton of hydrolyzable formaldehyde was recovered.

EXAMPLE 4

An example of reducing the use of antimicrobial drugs is shown below. A typical batch of pig feed used in commercial production of 3000 pigs per year is shown in Table 2 (all quantities in kg).

TABLE 2

| INGREDIENTS | PRESTARTER | STARTER | FINISHER | GESTATION | LACTATION |
|---|---|---|---|---|---|
| Maize | 431 | 800 | 716 | 740 | 671 |
| Soya | 280 | 315 | 275 | 157 | 236 |
| Wheat Bran | — | — | 160 | 180 | 180 |
| Wheat Polland | 60 | 90 | 230 | 180 | 180 |
| Skim Milk | 75 | — | — | — | — |
| Rice Polishing | — | 105 | 70 | 175 | 105 |
| Palm Oil | 34 | 34 | — | — | 34 |
| Dicalcium | 10 | 12 | — | 20 | 20 |

TABLE 2-continued

| INGREDIENTS | PRESTARTER | STARTER | FINISHER | GESTATION | LACTATION |
|---|---|---|---|---|---|
| Phosphate | | | | | |
| Limestone | — | 14 | — | 14 | 14 |
| Salt | 5 | 6 | — | 6 | 6 |
| Premix | 10 | 11.25 | 60 | 7.5 | 15 |
| Fish Meal | 50 | 75 | 75 | 75 | 75 |
| Sugar | 30 | — | — | — | — |
| Stafac | 1.0 | 1.5 | — | — | — |
| Stacidem | 2.4 | — | — | — | — |
| NaHCO$_3$ 99.5% | 4.8 | 7.2 | — | — | — |
| Chlorotetracycline | 2 | 4.5 | — | — | 4.5 |
| Tiotilin 10% | 0.5 | — | — | — | 0.75 |
| Destonate | — | 0.3 | — | — | — |
| Mycostatin 20% | 1.0 | — | — | 2 | 2 |
| Dimetridazole 100% | 0.2 | 0.3 | 0.3 | — | — |

Mycostatin 20% and Dimetridazole 100% are generally added to reduce the incidence of bloody scours (dysentery) and improve feed efficiency. When these drugs were used in a control group the incidence of blood scours in the pigs was 5% up to the age of three weeks, and the overall mortality rate was 2%. When Mycostatin 20% and Dimetridazole 100% were deleted and the pigs were raised exclusively on the same food treated with the 33% formaldehyde solution of Example 1 (prestarter 1.0 kg dry wt. of formaldehyde; starter, finisher, gestation and lactation feeds 1.5 kg dry wt. of formaldehyde each) the incidence of bloody scours went to near zero, the incidence of pneumonia in the pigs was greatly decreased and the general health of the herd improved. The feed conversion was 3.19 using formaldehyde-treated feed compared to 3.30 in the control experiment. The overall mortality rate was 1.5%. So in addition to reduced drug usage an economic benefit was realized as well.

EXAMPLE 5

Chickens (1,400,000 broilers) were raised with steam pelletized formaldehyde-treated feed and 250,000 broilers were raised with conventional steam pelletized feed. This test was conducted from the time the chicks were a day old until market weight which is 7 to 8 weeks. The data are summarized below.

| POUNDS FORMALDEHYDE (dry wt.) PER TON OF FEED | MORTALITY | FEED CONVERSION[1] | DRUG COST/BIRD |
|---|---|---|---|
| 0 | 7% | 2.28 | 3.12¢ |
| 1.0 | 6% | 2.25 | 1.69¢ |

[1]Feed conversion is pounds of feed required to produce one pound live weight gain.

Due to improved health (lower mortality), better feed conversion and lower drug usage a significant economic advantage was realized. Considering the fact that feed conversion was about 1% better using formaldehyde-treated feed, it would be possible to further reduce drug usage by decreasing the dose of chlortetracycline until the feed conversion reached 2.28, according to the present invention.

EXAMPLE 6

A test using formaldehyde-treated feed and untreated feed in 60,000 broilers was conducted. The results are summarized below:

The number of chickens in the test was 60,000 —divided into 6 pens, 3 treated, 3 controls.

Breed of broiler—Hubbard

Density (no. of broilers/sq. meters)—10

Days on test—from day old to 44 days old

Feed—commercial

Vaccination program—same for treated and untreated

Feed Medication —

| | starter ration | finisher ration |
|---|---|---|
| A. Control (Pelletized Feed) | | |
| Furazolidone mg/kg | 232 | 116 |
| Chlortetracycline mg/kg | 100 | 50 |
| Bacitracin mg/kg | 100 | 50 |
| Total drugs mg/kg | 432 | 216 |
| Cost of drugs per ton | $11.28 | $5.64 |
| B. Formaldehyde-Treated Feed (Pelletized) | | |
| Dry wt. of Formaldehyde g/kg of feed | 0.33 | 0.33 |
| Cost of Formaldehyde per ton | $4.93 | $4.93 |

-continued

| | starter ration | finisher ration |
|---|---|---|
| (No drugs used in this feed) | | |

Both diets had the same nutritional quality and were formulated as follows:

| Protein | 22.0% |
|---|---|
| Crude fiber | 3.0% |

| | | |
|---|---|---|
| Calcium | 1.0% | |
| Usable phosphorus | 0.45% | |
| Total phosphorus | 0.60% | |
| Metabolizable energy | 3180.00 kcal/kg | |
| Available lysine | 0.47% | |
| Moisture | 12.8% | |
| Fat | 7.0% | |

The rations contained No. 2 yellow corn, soybean meal (48% protein), fish meal, meat meal, beef tallow, dicalcium phosphate, vitamins, minerals, antioxidant and trace minerals, plus the medications mentioned above were added to the controls. The results are shown below.

| Concept | Formaldehyde Treated | Control |
|---|---|---|
| Number broilers at start | 30,000 | 30,000 |
| Number died | 2,094 | 2,274 |
| Cost of medicine[1] | $550.00 | $855.00 |
| Feed conversion | 2.13 | 2.22 |
| Average weight of broiler at slaughter, kg | 1.89 | 1.81 |

[1]These medicines were used to treat individual diseases and are in addition to feed medication.

EXAMPLE 7

An experiment was designed to determine if the spray application method affects the residual activity of formaldehyde in preventing Salmonella recontamination. Poultry starter mash was distributed in one gallon glass jars (2000 g/jar). The mash was autoclaved at 121° C. and 15 psi for one hour on two consecutive days. The sterile poultry starter mash was mixed thoroughly and subsampled using a Humboldt sample splitter to obtain seven 500g subsamples. The subsamples were individually treated with formaldehyde (1.32 lb dry wt./ton) in a barrel-type stainless steel mixer equipped with an atomizing spray nozzle or in a mixer with a hydraulic type nozzle. After treatment the samples were stored in paper bags at 24° C. prior to the recontamination.

An isolate of Salmonella typhimurium was obtained from poultry feed and was serotyped by the United States Department of Agriculture (USDA) National Veterinary Services Laboratory in Ames, Iowa. The isolate was used to inoculate milk dilution bottles containing 90 ml of nutrient broth. The inoculated bottles were incubated at 35° C. for 18–24 hours. After incubation, the contents of several milk dilution were combined in a sterile 1000 ml Erlenmeyer flask and mixed. The level of Salmonella typhimurium was determined by serially diluting the nutrient broth with buffered phosphate solution and the dilutions plated on modified lysine iron agar. The inoculated plates were incubated at 35° C. for 18–24 hours. After incubation, the number of Salmonella typhimurium colonies was counted.

After 7 days of storage, the subsamples of poultry starter mash (500g) were individually inoculated with 20 ml of the nutrient broth culture of Salmonella typhimurium ($10^3$ colonies/gram). The inoculated feed was transferred to sterile one quart containers with screw cap lids. After 24 hours incubation at 25° C., the 500g samples were split to obtain 25g subsamples. Each subsample was placed into a 500 ml culture bottle containing 225 ml of M-9 pre-enrichment media and incubated for 6h at 37° C. The samples were serially diluted with buffered phosphate and plated on modified lysine iron agar. The plates were incubated at 37° C. for 24h prior to enumeration.

Confirmation of Salmonella

The M-9 pre-enrichment media was incubated an additional 18h at 37° C. to recover low levels of Salmonella and stressed or damaged cells. After incubation a 1.0 ml aliquot was transferred to a test tube containing 9.0 ml of tetrathionate enrichment broth and incubated at 43° C. for 24h. The enrichment broth was streaked on plates of modified iron lysine agar and xylose-lysine-tergitol 4 agar. The plates were incubated at 37° C. for 24h. The numbers of Salmonella typhimurium colonies per gram of feed are presented in the following table.

| | COLONIES/GRAM | |
|---|---|---|
| TREATMENT | HYDRAULIC | ATOMIZING |
| Control | $2.74 \times 10^3$ | $2.74 \times 10^3$ |
| Formaldehyde-1.32 lb/ton | $2.94 \times 10^2$ | <1/25 |

EXAMPLE 8

An experiment was designed to determine if the spray application method affects the residual activity of formaldehyde in preventing recontamination by E. coli. Poultry starter mash (8000 g) was distributed in one gallon glass jars (2000 g/jar). The mash was autoclaved at 121° C. and 15 psi for one hour on two consecutive days. The sterile poultry starter mash was mixed thoroughly and subsampled using a Humboldt sample splitter to obtain seven 500 g subsamples. The subsamples were individually treated with formaldehyde (0.66, 1.32 or 2.00 lbs dry wt./ton) in a barrel-type stainless steel mixer equipped with an atomizing spray nozzle or with a hydraulic type nozzle. After treatment the samples were stored at 24° C. for 7 days prior to the recontamination.

The identity of an isolate of Escherichia coli obtained from poultry feed was confirmed by biochemical and serological tests. The isolate was used to inoculate milk dilution bottles containing 90 ml of nutrient both. The inoculated bottles were incubated at 35° C. for 18–24 hours. After incubation the contents of several milk dilution bottles were combined in a sterile 1000 ml Erlenmeyer flask, mixed and the level of Escherichia coli determined by serially diluting the nutrient broth with buffered phosphate. The dilutions were plated onto MacConkey's agar. The inoculated plates were incubated at 35° C. for 18–24 hours. After incubation, the number of E. coli colonies was counted.

After seven days of storage, the subsamples (500 g) were individually inoculated with 20 ml of a nutrient broth culture of E. coli ($10^6$ colonies/ml). The inoculated feed was transferred to sterile one quart containers with screw cap lids. After 24 hours incubation at 25° C., the treatment samples were split to obtain 10 g subsamples. Each subsample was placed into a milk dilution bottle containing 90 ml of buffered phosphate. The bottles were placed on a wrist action shaker and agitated for 30 minutes. The samples were serially diluted with buffered phosphate and the dilutions plated onto MacConkey's agar (MA) or Hektoen Enteric agar (HEA). The inoculated plates were incubated at 35° C. for 18–24 hours. After incubation, the number of E. coli colonies was counted. The absence or presence of E. coli in the treated poultry starter mash was confirmed by the U.S. Pharmacopeia Test listed in the 1986 edition of the FDA Bacteriological Analytical Manual (limit of detection <1 colony/25 grams). In this procedure a 25 g subsample was incubated in 225 ml lactose broth for 18–20 hours at 35° C. The inoculated broth was streaked on plates of MacConkey's agar and incubated for hours at 35° C. The numbers of *E. coli* colonies/g were averaged for the treatment replicates and are presented in the table below.

| TREATMENT | COLONIES/GRAM | |
| --- | --- | --- |
|  | HYDRAULIC | ATOMIZING |
| Control | $1.28 \times 10^6$ | $1.28 \times 10^6$ |
| Formaldehyde-0.66 lb/ton | $2.74 \times 10^5$ | $1.11 \times 10^2$ |
| Formaldehyde-1.32 lb/ton | $3.67 \times 10^3$ | <1/25 |
| Formaldehyde-2.00 lb/ton | $1.04 \times 10^2$ | <1/25 |

EXAMPLE 9

The procedure of Example 8 was repeated using an inoculum containing $10^4$ colonies/ml of *E. coli*. The numbers of *E. coli* colonies/g were averaged for the treatment replicates and are presented in the table below.

| TREATMENT | COLONIES/GRAM | |
| --- | --- | --- |
|  | HYDRAULIC | ATOMIZING |
| Control | $1.98 \times 10^4$ | $1.98 \times 10^4$ |
| Formaldehyde-0.66 lb/ton | $8.78 \times 10^3$ | >1/25 |
| Formaldehyde-1.32 lb/ton | $4.33 \times 10^3$ | <1/25 |
| Formaldehyde-2.00 lb/ton | $3.33 \times 10^2$ | <1/25 |

EXAMPLE 10

Formaldehyde Vapor Release From Feed

Poultry starter mash (2 kg) was treated at a rate of 2 kg of 37% solution formaldehyde per ton in a horizontal mixer and the treated feed was transferred to glass storage containers. The feed was shaken prior to sampling. Formaldehyde vapor release from the treated feed was measured at 0, 6, 12, 24 and 48 hours after treatment. The storage containers were sealed between sampling intervals with screw cap lids. Formaldehyde vapor release was monitored over a 15 minute time interval by impinger tubes and a high flow pump (1.0 l/min). The experiment was repeated and the results are summarized in the following table.

| Time Interval | Formaldehyde Concentration (ppm) | |
| --- | --- | --- |
| (hour) | Experiment 1 | Experiment 2 |
| 0 | 0.21 | 0.29 |
| 6 | 0 | 0.06 |
| 12 | 0 | 0.02 |
| 24 | 0 | 0 |
| 48 | 0 | 0 |

EXAMPLE 11

Microbiological Assay for *E. Coli* and Other Coliform Bacteria

A 10 g subsample of feedstuff is placed into a milk dilution bottle containing 90 ml of buffered phosphate solution. The milk dilution bottle is placed on a wrist action shaker and agitated for 30 minutes. The sample is serially diluted with the buffered phosphate solution and plated on MacConkey's agar (MA) or Hektoen Enteric agar (HEA). The inoculated plates are incubated at 35° C. for 18–24 hours. After incubation, the number of *Escherichia coli* colonies are counted. The absence or presence of *E. coli* in the feedstuff is confirmed by the U.S. Pharmacopeia Test listed in the 1986 edition of the FDA Bacteriological Analytical Manual. In this procedure a 25 g subsample of feedstuff is incubated in 225 ml of lactose broth for 18–20 hours at 35° C. The inoculated broth is streaked on plates of MacConkey's agar and incubated for 24 hours at 35° C.

EXAMPLE 12

Microbiological Assay for Aerobic Bacteria

A 10 g subsample is placed into a milk dilution bottle containing 90 ml of buffered phosphate solution. The milk dilution bottle is placed on a wrist action shaker and agitated for 30 minutes. The sample is serially diluted with the buffered phosphate solution and the dilutions plated on nutrient agar. The inoculated plates are incubated at 35° C. for 18–24 hours. After incubation, the number of aerobic bacteria colonies are counted.

EXAMPLE 13

Microbiological Assay for Salmonella

A 25 g subsample is placed in a 500 ml jar containing 225 ml of pre-enrichment media consisting of minimal salts and dextrose. The jar is incubated at 37° C. in a laboratory incubator for 6 hours prior to serial dilution with buffered phosphate. The dilutions are plated on modified lysine iron agar and the inoculated plates are incubated at 37° C. for 18–24 hours. After incubation the Salmonella colonies are counted. Low levels of Salmonella and stressed or damaged cells are recovered by an additional 18 hours of incubation at 37° C. of the pre-enrichment media, 24 hours of incubation at 43° C. in enrichment media (tetrathionate broth), and selective agar plating. The inoculated plates are incubated at 37° C. for 18– 24 hours prior to the identification of Salmonella. Confirmation of the presence of Salmonella is by the AOAC procedure described in the 6th edition of the Bacteriological Analytical Manual.

EXAMPLE 14

Measurement Of Formaldehyde Adduct In Feed Samples

1. Scope

This test method is suitable for formaldehyde concentrations in the range of 0.2 to 4.0 mg/l in distilled samples which corresponds to 8 –160 mg of formaldehyde/kg of feed. For samples with concentrations greater than 160 mg/kg the distillate should be diluted with reagent grade water prior to analysis.

2. Summary of the Method

A feed sample mixed with reagent grade water and phosphoric acid is distilled to release the formaldehyde bound to the feed. An aliquot of the distilled sample is combined with an equal volume of an acetylacetone reagent in a test tube. The tube is capped, shaken and reacted at 60° C. for 10 minutes. After cooling, the absorbance of the solution is read at 412 nm. The concentration is calculated from a curve of standard formaldehyde solutions. The chemical reaction is based on the Hantzsch reaction. Formaldehyde reacts with acetylacetone in the presence of ammonium ion to form the yellow compound 3,5-diacetyl-1,4-dihydrolutidine.

3. Reagents and Materials

Reagent water—Deionized or distilled water that conforms to Type I or Type II (should be free of formaldehyde, residual chlorine, phenolic compounds and substances that interfere with this test).

Acetylacetone Reagent—Weigh 154 g of ammonium acetate into a 400 ml beaker. Dissolve the crystals in a small volume of water. Transfer to a 1 liter volumetric flask. Add 2.0 ml of acetylacetone and 3.0 ml of glacial acetic acid to the flask. Add water to mix thoroughly, and dilute to 1 liter. Store the solution in an amber glass container at 4° C. This reagent will last for 3 months if properly stored.

Formaldehyde Solution. Stock (1000 mg/l)—Dilute 2.7 ml of 37% formaldehyde solution to 1 liter with water. This solution should be stored at room temperature in glass amber bottle, and should be standardized every 6 months using the following procedure: Calibrate pH meter with the standard 7.0 and 10.0 pH buffers. Pipet 50.0 ml of the formaldehyde stock solution in a 125 ml Erlenmeyer flask, and add 20.0 ml of sodium sulfite solution. Cap and allow the mixture to stand for 5 minutes. Add a magnetic stir bar, and place solution on magnetic stirrer. Titrate rapidly to a stable end point of pH 9.5 with 0.1N hydrochloric acid. Calculate the concentration of formaldehyde stock solution as follows:

$$\text{HCHO, mg/l} = \frac{(\text{HCl titrant, ml}) \times (\text{HCl, N}) \times (30.03)}{\text{stock formaldehyde, ml}}.$$

Perform three replications and calculate the mean concentration. Replicates should agree to within 0.3%.

Sodium Sulfite solution (0.1M) should be freshly prepared. Dissolve 31.5 g of anhydrous sodium sulfite in 150 ml of water and dilute to volume in a 250 ml volumetric flask. Adjust to pH 9.5 with 1N hydrochloric acid.

4. Sampling

Representative feed samples should be protected from light and kept at 4° C. Distilled samples should be collected in amber bottles and kept at 4° C. before analysis with Teflon-lined lids.

5. Calibration: Prepare a series of 4 standards in 100 ml volumetric flasks as follows:

| Conc. mg/l | ul of 1000 mg/l HCHO |
| --- | --- |
| 0.5 | 50 |
| 1.0 | 100 |
| 2.0 | 200 |
| 4.0 | 400 |

Make up to 100 ml final volume with deionized water. Place 2 ml from each standard into a test tube. Add 2 ml of acetylacetone reagent, cap tightly, shake well, and place the tubes in the water bath at 60° C. for 10 ±1 minute. Remove the tubes from the water bath and cool to room temperature. Amber bottles, test tubes, and lids must be properly washed, rinsed with ethanol, and dried at 130° C. for 2–3 hrs before use to minimize contamination.

Zero the spectrophotometer with water at 412 nm. Measure the absorbance of the standard solutions and samples. The color is stable for several hours. Clean all glassware as soon as possible after using by washing with detergent and hot water, rinsing with hot tap water, followed by distilled water rinse. Drain glassware and place in 130° C. oven for several hours.

Distillation Procedure

Weigh 5.0 ±0.1 g of sample in a plastic boat. Funnel feed into 1000 ml round flask. Add 200 ml of deionized water to flask. Add approximately 2 ml of 85% phosphoric acid and few glass beads. Connect flask to trap and condenser, turn on cooling water and turn on heating mantle(s). Receive distillate in amber bottles. Stop distilling when exactly 100 ml have been collected. Cap bottles with teflon lined caps and store at 4° C. until analysis by color reaction. After distilling samples, clean up distillation set-up by distilling approximately 100 ml of deionized water in between samples.

Analysis: Measure 2 ml of distilled sample into test tube. Add 2 ml of acetylacetone reagent. Process samples in the same manner as the standards. The formaldehyde concentration of the distilled samples is calculated by reading the milligrams per liter on the standard curve which corresponds to the absorbance of the sample. Calculate the formaldehyde concentration of the feed sample as follows:

$$\text{HCHO, kg/ton} = \frac{\text{mg/l of HCHO in distilled sample} \times 0.2 \, 1/1000}{.005 \, \text{kg}}$$

EXAMPLE 15

To determine the variability of hydrolyzable formaldehyde adduct distribution due to different methods of spray application poultry starter mash was purchased from a commercial supplier and split to obtain representative 1000 g subsamples. The subsamples were treated with 1 kg/ton of a 37% formaldehyde solution in a laboratory scale feed mixer equipped with liquid spray nozzles. The liquid spray nozzles delivered a course spray (Experiment 1) or a fine spray (Experiment 2) of the formaldehyde solution.

In a commercial feed mill, formaldehyde (33% solution) was applied to 6000 pounds of poultry starter mash (Experiment 3 in the following table) in a 3 ton horizontal feed mixer at a rate of 1 kg solution per ton of feed. The formaldehyde was applied by three air atomizing nozzles located on the top of the mixer. The formaldehyde solution was applied in 90 seconds and the feed was mixed an additional 4 minutes. The treated feed was subsampled with a Humboldt sample splitter to obtain ten replicate samples of each type of treated feed. These samples (5 g) were assayed for formaldehyde by the procedure in Example 14. The levels of formaldehyde recovered from the treated feed samples represent the adduct and allow for calculation of a coefficient of variation. The results are presented in the following table.

VARIATIONS IN THE
CONCENTRATION OF FORMALDEHYDE (KG/TON) RECOVERED
FROM FEED DUE TO THE METHOD OF APPLICATION

| SAMPLE # | FORMALDEHYDE ADDUCT (kg/TON) | | |
|---|---|---|---|
| | EXPERIMENT 1 COURSE SPRAY (1 NOZZLE) | EXPERIMENT 2 FINE SPRAY (1 NOZZLE) | EXPERIMENT 3 FINE SPRAY (3 NOZZLES) |
| 1 | 0.425 | 0.334 | 0.322 |
| 2 | 0.301 | 0.370 | 0.339 |
| 3 | 0.336 | 0.376 | 0.339 |
| 4 | 0.369 | 0.369 | 0.334 |
| 5 | 0.395 | 0.364 | 0.331 |
| 6 | 0.358 | 0.344 | — |
| 7 | 0.389 | 0.380 | — |
| 8 | 0.423 | 0.380 | — |
| 9 | 0.322 | 0.381 | — |
| 10 | 0.383 | 0.403 | — |
| MEAN ± STANDARD DEVIATION | 0.3701 ± 0.0413 | 0.3681 ± 0.0167 | 0.3330 ± 0.0070 |
| % COEFFICIENT OF VARIATION | 11.16 | 4.53 | 2.11 |

The coefficient of variation is much smaller (2.11% and 4.53%) using the atomizing spray method than in the course spray method (11.16%). In Experiment 1, sample 1 contained 425 grams of formaldehyde adduct per ton while sample 9 contained only 322 grams of adduct per ton. This wide variation indicates that the formaldehyde was not distributed evenly, which indicates that there are regions of the feed which received little or none of the formaldehyde solution. Thus, too little adduct may have formed to prevent recontamination of isolated areas even if the initial contamination was effectively killed.

EXAMPLE 16

Field Sampling Procedures for Feed and Feed Ingredients
1. Objective
   To provide a means of obtaining a representative sample of whole grain, finished feed or processed meal from rail cars, truck lots, storage bins, or feeding pans and troughs.
2. Sampling Equipment
   2.1. Grain probe with partitions, double, brass, 1⅜" diameter by 63" long, 10 openings (Seedburo #22P).
3. Sampling
   Sample Size: Collect a minimum of 5 kg of whole grain and 1 kg of finished feed or processed meal.
   3.1. Bulk Car
      3.1.1. Probe Sample Procedure (Prior to Unloading)
         1. Insert 63" probe as far as it will go (see FIG. 5).
         2. Open probe compartments and obtain sample.
         3. Close compartments and extract probe.
         4. Take 10 probe samples of grain or five of feed or processed meal (see FIG. 6 A). The total sample collected is transferred to a sample bag, labeled and mailed to laboratory along with a note stating which analyses are requested.
      3.1.2. Stream Sampling
         The most effective sampling method to obtain a representative sample from a bulk car is during the loading or unloading process. Either automatic sampling equipment or grab samples can be used. Collect a series of samples weighing from 50–100 grams as the grain is being loaded or unloaded. A total of 5 kg of whole grain and 1 kg of meal or finished feed should be obtained. Take the first sample as soon as the loading begins and the last one near the end of the loading. Transfer the total sample collected to a sample bag, label and mail to laboratory along with a note stating which analyses are requested.
   3.2. Hopper Car
      3.2.1. Probe Sample Procedure (Prior to unloading)—Same as outline under Bulk Car except follow FIG. 6 B for sampling pattern.
      3.2.2. Stream Sampling Same as outlined under Bulk Car.
      3.2.3. Car Bottom Sample Procedure (Prior to unloading)
         1. Crack the bottom of each hopper and with a shovel collect a portion of the first material out of each hopper; collect about 1.0 kg of whole grain or 0.5 kg of meal or finished feed.
         2. Add bottom sample to probe sample on canvas.
         3. Place total sample in sample bag, close securely, label and mail to laboratory with form stating which analyses are requested.
      3.2.4. Separate Car Bottom Sample Procedure (Prior to Unloading)
         If the material from the bottom of the hopper car appears to be of poorer quality than the rest of the load, a separate 5 kg sample of grain or 1 kg sample of feed or meal should be collected and submitted for analyses. This sample should be labeled as hopper-car-bottom sample.
   3.3. Bulk Truck
      Sampling should be carried out as outlined under "Bulk Car". The sampling pattern shown in FIG. 6 C should be used. On tandem trucks, each trailer should be treated as a separate load.
   3.4. Storage Bins
      3.4.1. During loading or unloading
         The only practical way to obtain a representative sample from a storage bin is during the loading or unloading process. Either automatic sampling equipment or grab samples can be used. Collect a series of samples weighing from 50 to 100 grams as the grain is being loaded or unloaded. A total of 5 kg of whole grain and 1 kg of meal or finished feed should be obtained. Take the first sample as soon as the loading begins and the last one near the end of the loading. Transfer the total sample collected to a sample bag, label and mail to laboratory along with a note stating which analyses are requested.

Figure 1:
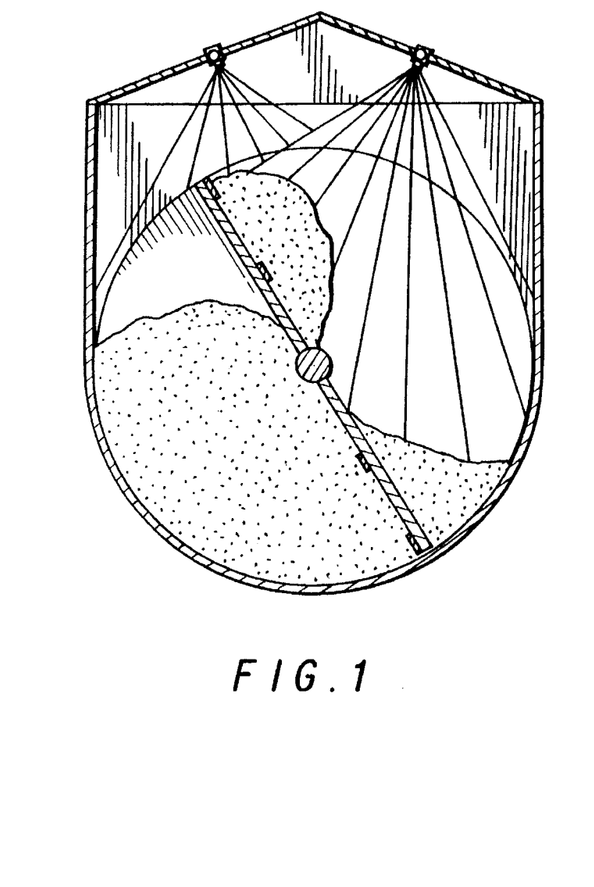
FIG. 1 is an end view illustration showing the application of formaldehyde solution to feedstuff in a screw type auger. Formaldehyde is applied by two atomizing spray nozzles located 3 feet apart on opposite sides of the top cover.
Figure 2:
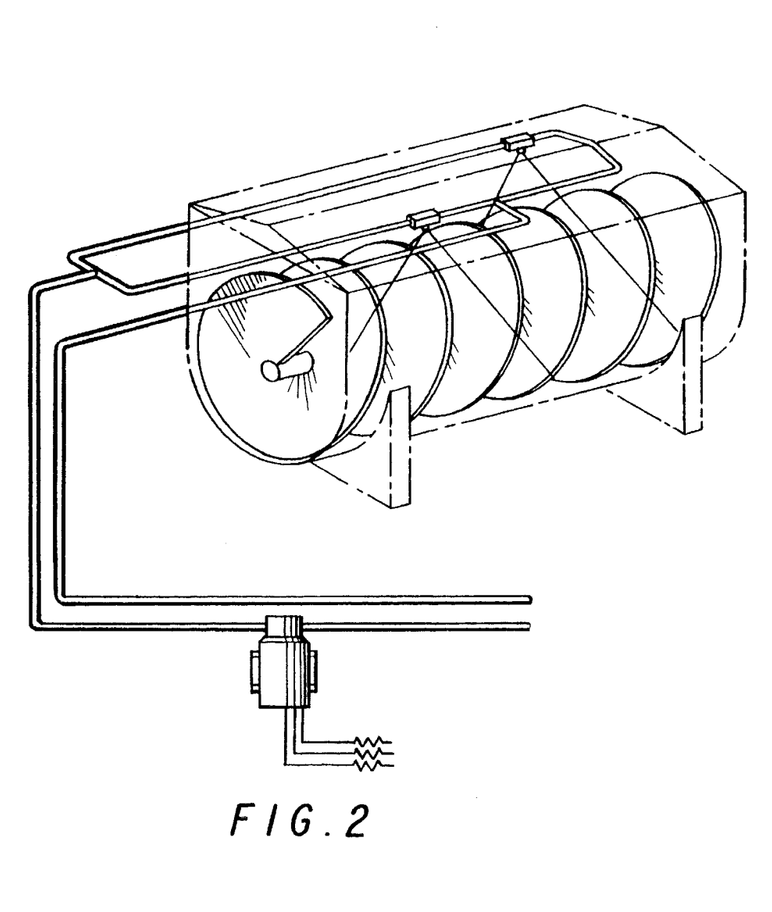
FIG. 2 is a lateral view illustration showing the application of formaldehyde solution in a screw type auger.
Figure 3:
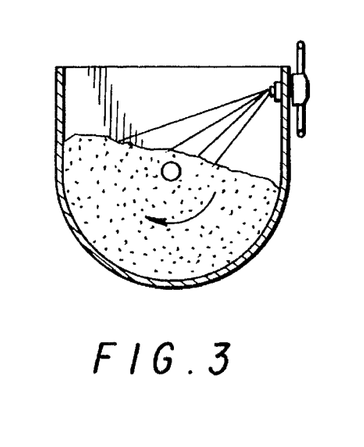
FIG. 3 is an end view illustration showing the application of formaldehyde solution to feedstuff in a horizontal feed mixer. Formaldehyde is applied by two atomizing spray nozzles located 3 feet apart on the up side of the feed mixer.
Figure 4:
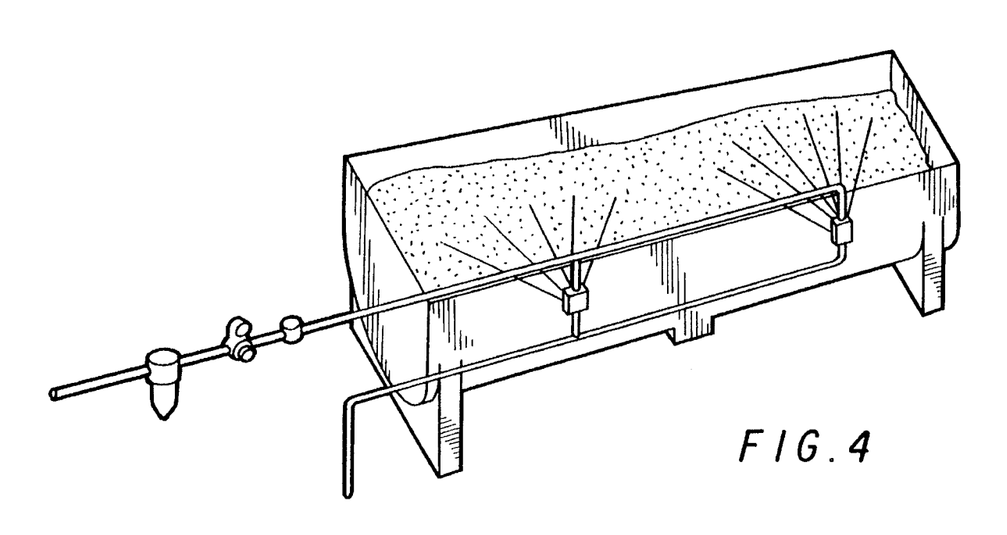
FIG. 4 is a lateral view illustration showing the application of a formaldehyde solution in a horizontal feed mixer.
Figure 5:
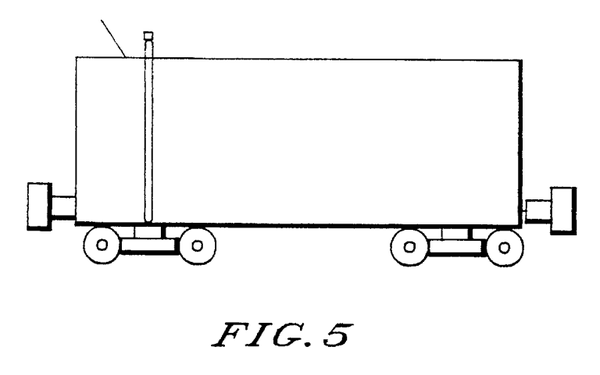
FIG. 5 illustrates the proper use of a sampling probe.
Figure 6A:
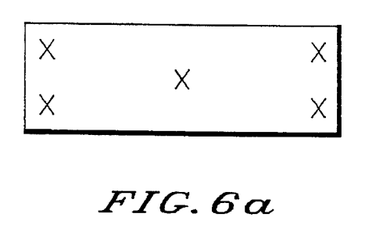
FIG. 6 illustrates sampling patterns for sampling bulk cars, hopper cars and bulk trucks.
Figure 6B:
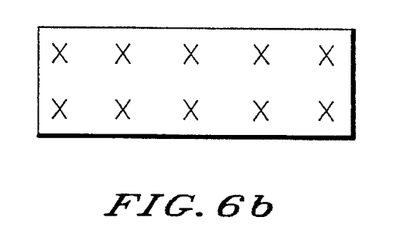
Figure 6C:
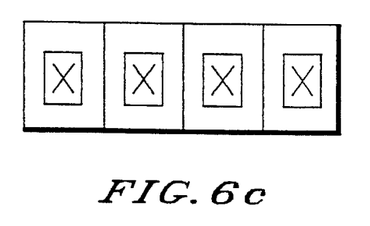
Figure 6D:
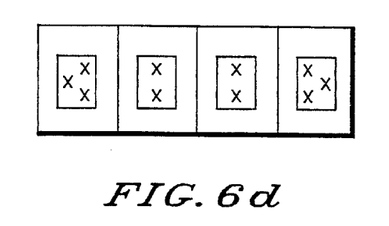
Figure 6E:
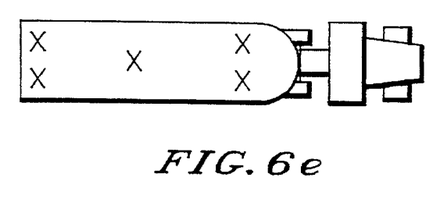
Figure 6F:
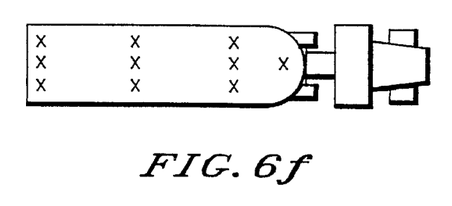
Figure 7A:
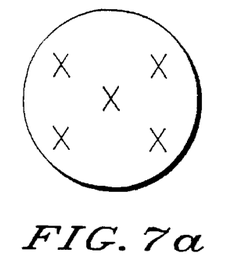
FIG. 7 illustrates sampling patterns for probe sampling feed, meal or whole grain in storage bins.
Figure 7B:
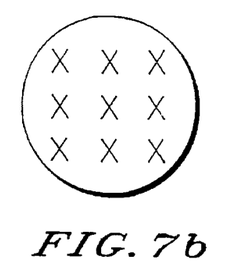
Figure 7C:
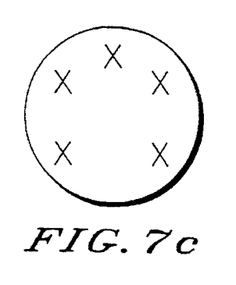
Figure 7D:
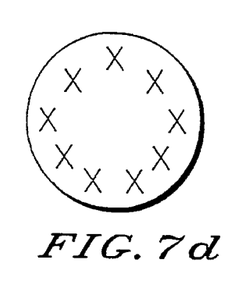
Figure 7E:
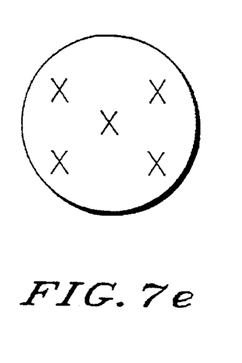
Figure 7F:
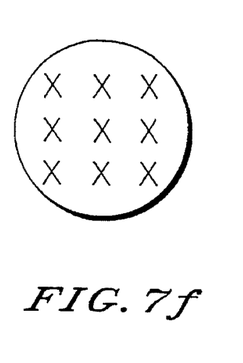

3.4.2. Probed Samples
1. Collect 5 probes of feed of meal, or 10 probes of whole grain according to the sampling pattern in FIG. 7 D. Collect about 0.5 kg from bottom of bin using auger and combine this with probed sample (if augured sample is collected, omit one of the probes from the top of the stored material.
2. If moisture accumulation is suspected use probe pattern 7 E to collect potentially moist material from the edges of the bin and probe pattern 7 F to collect potentially less moist material from the center of the bin.
3. Transfer the edges-sample and the center-sample to two separate sample bags, close securely and mail to laboratory along with a note stating which analyses are requested. Label the one sample as "Storage Bin Edges" and the other as "Storage Bin Center".

3.5. Pans and Troughs
3.5.1. Pans in Poultry House
Collect twelve 75 gram grab samples in sample bag, four at the first station the feed reaches, four at the middle station and four at the last station the feed reaches.
2. Close bag securely and mail it to laboratory along with a note stating which analyses are requested.

3.5.2. Troughs
1. Collect twelve 75 gram grab samples randomly from trough. Take some samples from each section of the trough.
2. Close bag securely and mail it to laboratory along with a note stating which analyses are requested.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An animal feed which is resistant to contamination by Salmonella or *E. coli* comprising: 100–1000 grams of hydrolyzable formaldehyde adduct per ton of feed distributed with a coefficient of variation of 7% or less; and 1–20 wt% water; wherein resistance to contamination means that a challenge with 1000 calories of Salmonella or *E. coli* per gram of feed results in 1 colony or less per 25 grams of feed after 24 hours incubation at 25° C.

2. The animal feed of claim 1 comprising: a member selected from the group consisting of corn, grain sorghum, wheat, barley, oats, soybean meal, cottonseed meal, feather meal, animal by-products and vegetable protein meal; and further comprising at least one additive selected from the group consisting of a $C_1$–$C_8$-alcohol, a terpene, and mixtures thereof, in addition to any carboxylic acid, alcohol or terpene present in said member.

3. The feed of claim 2 containing at least one added carboxylic acid selected from the group consisting of formic acid, acetic acid, propionic acid, benzoic acid, sorbic acid, lactic acid and butanoic acid; and at least one alcohol selected from the group consisting of methanol, ethanol, propanol, butanol, pentanol, hexanol, heptanol, octanol and phenol.

4. The feed of claim 1 containing 100–660 grams of hydrolyzable formaldehyde adduct per ton of feed distributed with a coefficient of variation of 5.5% or less.

5. The feed of claim 1 containing 200–500 grams of hydrolyzable formaldehyde adduct per ton of feed distributed with a coefficient of variation of 3.5% or less, and 12% water or less.

6. The feed of claim 1 that is a complete animal feed or that comprises a member selected from the group consisting of cereal grain, vegetable protein meal and animal by-product meal said feed having resistance to contamination after 45 days storage under aerobic conditions prior to challenge.

7. The feed of claim 1 comprising a member selected from the group consisting of corn, grain, sorghum, wheat, barley, oats, cottonseed meal and soybean meal, said feed having resistance to contamination after 45 days storage under aerobic conditions prior to challenge.

8. A formaldehyde-treated animal feed which is resistant to contamination by Salmonella or *E. coli* obtained by a process comprising:
spraying droplets of an aqueous solution containing 10–50 wt. % formaldehyde on a complete animal feed or a major ingredient thereof in an amount of 0.2–4.0 pounds dry weight of formaldehyde per ton of said complete animal feed or said major ingredient while mixing said complete animal feed or said major ingredient; and recovering a feed comprising 100–1000 grams of hydrolyzable formaldehyde adduct per ton of feed distributed with a coefficient of variation of 7% or less and 1–20% moisture; wherein resistance to contamination means that challenge with 1000 colonies of Salmonella or *E. coli* per gram of feed results in 1 colony or less per 25 grams of feed after 24 hours incubation at 25° C.

9. The feed of claim 8 wherein said major ingredient is selected from the group consisting of cereal grain, vegetable protein meal, animal by-product meal and feather meal, said feed having resistance to contamination after 45 days storage under aerobic conditions prior to challenge.

10. The feed of claim 8 wherein said major ingredient is selected from the group consisting of corn, grain sorghum, wheat, barley, oats, cottonseed meal and soybean meal, said feed having resistance to contamination after 45 days storage under aerobic conditions prior to challenge.

11. The feed of claim 8 wherein said spray droplet size is 10–250 microns, and the feed contains 100–1000 grams of adduct per ton distributed with a coefficient of variation of 5.5% or less.

12. The feed of claim 8 wherein the spray droplet size is 40–80 microns, and the feed contains 100–660 grams of adduct per ton distributed with a coefficient of variation of 3.5% or less.

13. The feed of claim 8 wherein said aqueous solution further comprises at least one member of the group consisting of a $C_1$–$C_8$-alcohol, a carboxylic acid or salt thereof, a terpene, and mixtures thereof.

14. The feed of claim 13 containing at least one added carboxylic acid selected from the group consisting of formic acid, acetic acid, propionic acid, butanoic acid, benzoic acid, sorbic acid, and lactic acid; and at least one alcohol selected from the group consisting of methanol, ethanol, propanol, butanol, pentanol, hexanol, heptanol, octanol and phenol.

15. The feed of claim 8 which is a complete animal feed, and contains 200–660 grams of adduct per ton of complete animal feed distributed with a coefficient of variation of 3.5% or less.

16. The feed of claim 8 which has been sprayed with 0.6–1.40 lbs. dry weight of formaldehyde per ton of feed using an aqueous 25–37% formaldehyde solution, and a spray droplet size of 20–80 microns, wherein said adduct is distributed with a coefficient of variation of 2.0% or less.

17. The feed of claim 8 which has been sprayed with 1.41–4.0 lbs. dry weight of formaldehyde per ton of feed using an aqueous 25–37% formaldehyde aqueous solution, and a spray droplet size of 20–80 microns, wherein said adduct is distributed with a coefficient of variation of 5.0% or less.

* * * * *

UNITED STATES PATENT AND TRADEMARK OFFICE
CERTIFICATE OF CORRECTION

PATENT NO. : 5,505,976
DATED : April 9, 1996
INVENTOR(S) : Bobby J. BLAND et al.

It is certified that error appears in the above-indentified patent and that said Letters Patent is hereby corrected as shown below:

Column 5, line 50, delete "feed".

Column 10, line 20, replace "drug" with --drugs--.

Column 10, line 57, replace "·5" with --x 5--.

Column 17, line 4, after "for" insert --24--.

Column 23, line 6, replace "of" second occurrence with --or--.

Column 23, line 11, after "material" insert ")".

Signed and Sealed this

Twenty-first Day of July, 1998

Attest:

BRUCE LEHMAN

Attesting Officer

Commissioner of Patents and Trademarks